United States Patent
Koo et al.

(10) Patent No.: US 8,482,886 B2
(45) Date of Patent: Jul. 9, 2013

(54) PROTECTION CIRCUIT, RESONANT CONVERTER INCLUDING THE PROTECTION CIRCUIT, AND PROTECTING METHOD OF THE RESONANT CONVERTER

(71) Applicant: Fairchild Korea Semiconductor Ltd., Kyungki-do (KR)

(72) Inventors: Gwan-Bon Koo, Bucheon (KR); Hyun-Chul Eom, Seoul (KR); Jin-Tae Kim, Seoul (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 0 days.

(21) Appl. No.: 13/676,938

(22) Filed: Nov. 14, 2012

(65) Prior Publication Data

US 2013/0070372 A1    Mar. 21, 2013

Related U.S. Application Data

(63) Continuation of application No. 12/716,683, filed on Mar. 3, 2010, now Pat. No. 8,335,061.

(30) Foreign Application Priority Data

Mar. 5, 2009  (KR) .................. 10-2009-0019019

(51) Int. Cl.
| | |
|---|---|
| H02H 7/00 | (2006.01) |
| H02H 9/00 | (2006.01) |
| G05F 1/10 | (2006.01) |
| G05F 1/40 | (2006.01) |
| H02J 3/12 | (2006.01) |
| H02H 7/122 | (2006.01) |

(52) U.S. Cl.
USPC .............................. 361/18; 323/235; 363/58

(58) Field of Classification Search
USPC ........................................................ 361/18
See application file for complete search history.

(56) References Cited

U.S. PATENT DOCUMENTS

| | | | |
|---|---|---|---|
| 5,973,943 A | 10/1999 | Ribarich et al. | |
| 6,331,755 B1 | 12/2001 | Ribarich et al. | |
| 2006/0034123 A1 | 2/2006 | Feldtkeller et al. | |
| 2006/0050449 A1* | 3/2006 | Wu ................................ 361/18 |
| 2010/0226050 A1 | 9/2010 | Koo et al. | |

* cited by examiner

*Primary Examiner* — Dharti Patel
(74) *Attorney, Agent, or Firm* — Okamoto & Benedicto LLP

(57) ABSTRACT

The present invention relates to a protection circuit, a resonance converter having the same, and a protection method thereof. A resonance converter having high-side and low-side switches senses a current flowing through the low-side switch and determines a zero voltage switching failure by using a width of a current flowing to a negative direction of the low-side switch.

14 Claims, 7 Drawing Sheets

PROTECTION CIRCUIT, RESONANT CONVERTER INCLUDING THE PROTECTION CIRCUIT, AND PROTECTING METHOD OF THE RESONANT CONVERTER

CROSS-REFERENCE TO RELATED APPLICATION

This application is a continuation of U.S. patent application Ser. No. 12/716,683, filed on Mar. 3, 2010, which claims priority to and the benefit of Korean Patent Application No. 10-2009-0019019 filed in the Korean Intellectual Property Office on Mar. 5, 2009. The contents of the just mentioned disclosures are incorporated herein by reference in their entirety.

BACKGROUND OF THE INVENTION (a) Field of the Invention

The present invention relates to a protection circuit, a resonant converter including the same, and a protection method thereof. More particularly, the present invention relates to a method for protecting a resonant converter that has failed in zero voltage switching.

(b) Description of the Related Art

FIG. 1 schematically shows a conventional resonant converter.

As shown in FIG. 1, the resonant converter has two switches SW1 and SW2 that are alternately turned on/off. A resonance is generated between leakage inductance and magnetizing inductance of a transformer formed by a primary coil 1 and a secondary coil 2, and a capacitor 3, and a current Ip is generated by the resonance. A rectifying unit 4 generates a direct current DC by rectifying a current flowing through the secondary coil 2.

FIG. 2 shows a correlation between a gain that is a ratio (Vout/Vin) of an input voltage Vin and an output voltage Vout, and a switching frequency fs. The switching frequency implies an operation frequency that alternately turns on/off two switches SW1 and SW2.

As shown in FIG. 2, in the gain curve depending on a switching frequency, an operation region of the resonance converter can be divided into a zero voltage switching region and a zero current switching region with reference to a peak switching frequency ft (hereinafter referred to as a reference frequency). Here, a gain is maximized at the peak switching frequency. The right-side region (the case that the switching frequency fs is greater than the peak switching frequency ft) is a zero voltage switching region (hereinafter referred to as a ZVS region), and the left-side region (the case the switching frequency fs is smaller than the peak switching frequency ft) is a zero current switching region (hereinafter referred to as a ZCS region). The zero voltage switching implies that a voltage difference across switch is substantially zero before the switch turns on. The zero current switching implies that no current flows through a channel of the switch at a turn-off time of the switch. When the zero current switching occurs in the resonant converter using a MOSFET-type switch, it can be occurred reverse recovery at a body diode thereof and hard switching occurs at a turn-on time of the switch.

FIG. 3A shows a current flowing through a switch SW1 and a current Ip when a conventional resonant converter operates in the ZCS region.

As shown in FIG. 3A, when the converter operates in the ZCS region, reverse recovery occurs at a turn-off time of the switch SW1, and hard switching occurs at a turn-on time of the switch SW1.

FIG. 3B shows a current flowing through the switch SW1 and the current Ip when the conventional resonant converter operates in the ZVS region.

As shown in FIG. 3B, when the converter operates in the ZVS region, a current with a negative direction flows through the switch SW1 at the turn-on time of the switch SW1 so that a voltage difference across switch SW1 can be neglected.

As described, the reverse recovery at the body diode of the MOSFET switch and the hard switching occurring at the turn-on time of the switch can be prevented when the resonant converter operates in the ZVS region.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a protection circuit detecting a failure of a resonance converter in zero voltage switching and controlling the resonance converter to stop operation, a resonance converter having the same, and a protection method thereof.

A protection circuit according to an exemplary embodiment of the present invention detects zero voltage switching of a resonance converter including first and second switches. The protection circuit includes: a width measurement comparator comparing a sense voltage corresponding to a first current flowing through the first switch and a first reference voltage to generate a detection signal corresponding to a width of a negative part of the first current; a timer generating a width detection voltage corresponding to the width of the negative part of the first current by using the detection signal; and a ZVS determination comparator comparing the width detection voltage and a second reference voltage when the first switch is turned off to determine a zero voltage switching failure according to the comparison result. The protection circuit further includes a ZVS detection controller. The ZVS detection controller detects turn-on/off of the first switch, controls the ZVS determination comparator to compare the width detection voltage and the second reference voltage when the first switch is turned off, and resets the width detection voltage after a predetermined delay period. The timer includes a charge switch being turned on/off according to the detection signal, a current source connected to a first end of the charge switch, a capacitor having a first end connected to a second end of the charge switch, and a discharge switch connected in parallel with the capacitor. A voltage at the first end of the capacitor is the width detection voltage. The ZVS detection controller turns on the discharge switch after the delay period. The ZVS determination comparator includes a first input terminal, a second input terminal to which the second reference voltage is input, and a switch having a first end connected to the first input terminal, transmitting the width detection voltage to the first input terminal during a predetermined comparison period from a turn-off time of the first switch, and transmitting a source voltage to the first input terminal. The protection circuit according to the exemplary embodiment of the present invention further includes a protection signal generator receiving a zero voltage switching failure signal from the ZVS determination comparator and generating a protection signal to stop switching of the first and second switches.

A resonance converter having first and second switches includes a sense resistor in which a first end connected to a first end of the first switch and a ground and a protection circuit connected to a second end of the sense resistor, measuring a width of a negative part of a first current flowing through the first switch by using a sense voltage of the sense resistor, and stopping switching of the first and second switches when the width of the negative part of the first current is smaller than a predetermined reference value. The protection circuit includes a width measurement comparator comparing the sense voltage and a first reference voltage to generate a detection voltage corresponding to the width of the negative part of the first current, a timer generating a width detection voltage corresponding to the width of the negative part of the first current by using the detection signal, and a ZVS determination comparator comparing the width detection voltage and a second reference voltage when the first switch is turned off to determine a zero voltage switching failure according to the comparison result. The protection circuit further includes a ZVS detection controller detecting turn-on/off of the first switch, controlling the ZVS determination comparator to compare the width detection voltage and the second reference voltage when the first switch is turned off, and resetting the width detection voltage after a predetermined delay period from a turn-off time of the first switch. The timer includes a charge switch being turned on/off according to the detection signal, a current source connected to a first end of the charge switch, a capacitor having a first end connected to a second end of the charge switch, and a discharge switch connected in parallel with the capacitor. A voltage at the first end of the capacitor is the width detection voltage. The ZVS detection controller turns on the discharge switch after the delay period. The ZVS determination comparator includes a first input terminal, a second input terminal to which the second reference voltage is input, and a switch having a first end connected to the first input terminal, transmitting the width detection voltage to the first input terminal during a predetermined comparison period from the turn-off time of the first switch, and transmitting a source voltage to the first input terminal during a turn-on period of the first switch. In addition, the protection circuit further includes a protection signal generator receiving a zero voltage switching failure signal from the ZVS determination comparator and generating a protection signal to stop switching of the first and second switches, and the resonance converter further includes a gate driver that stops switching of the first and second switches according to the protection signal. Otherwise, the protection circuit further includes a protection signal generator receiving a zero voltage switching failure signal from the ZVS determination comparator and generating a protection signal for increasing switching frequencies of the first and second switches, and the resonance converter further includes a gate driver to increase the switching frequencies of the first and second switches according to the protection signal.

A protection method of a resonance converter having first and second switches includes generating a sense voltage corresponding to a first current flowing through the first switch, measuring a width of a negative part of the first current by using the sense voltage, and determining whether the width of the negative part of the first current is smaller than a predetermined reference value.

The measuring the width of the negative part of the first current by using the sense voltage includes generating a detection signal corresponding to the width of the negative part of the first current by comparing the sense voltage and a predetermined first reference voltage and generating a width detection voltage corresponding to the width of the negative part of the first current by using the detection signal. The width detection voltage corresponds to the width of the negative part of the first current. The determining compares the width detection voltage and a second reference voltage when the first switch is turned off to determine whether the width of the negative part of the first current is smaller than a predetermined reference value according to the comparison result. The protection method of the resonant converter further includes turning off the first and second switches by force when the width of the negative part of the first current is smaller than a predetermined reference. Otherwise, the protection method of the resonant converter further includes increasing operation frequencies of the first and second switches by force when the width of the negative part of the first current is smaller than a predetermined reference value.

The present invention provides a protection circuit that senses a current flowing through a switch to detect a failure in zero voltage switching, a resonance converter having the same, and a protection method thereof.

DETAILED DESCRIPTION OF THE EMBODIMENTS

Figure 1:
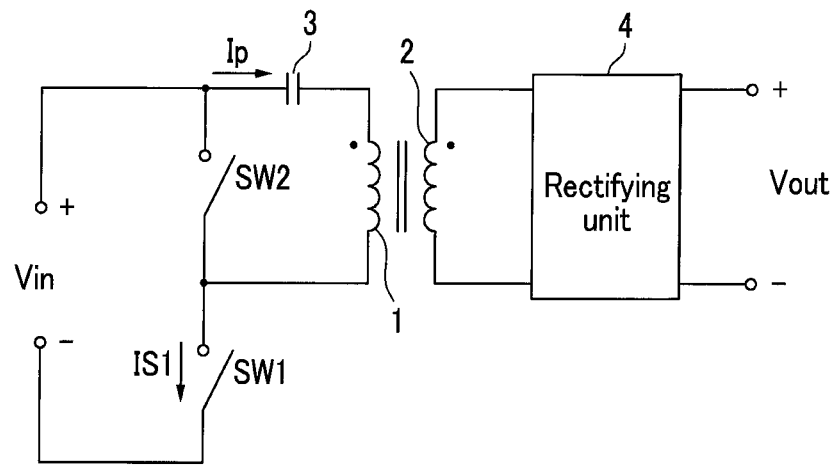
FIG. 1 schematically shows a conventional resonant converter.
Figure 2:
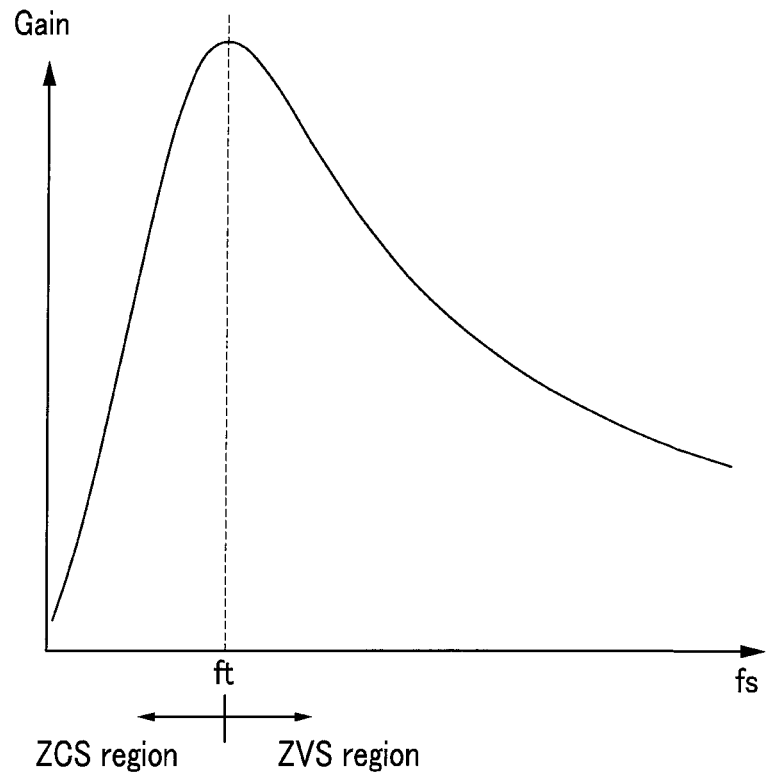
FIG. 2 shows a correlation between a gain which is a ratio between an input voltage and an output voltage, and a switching frequency.
Figure 3A:
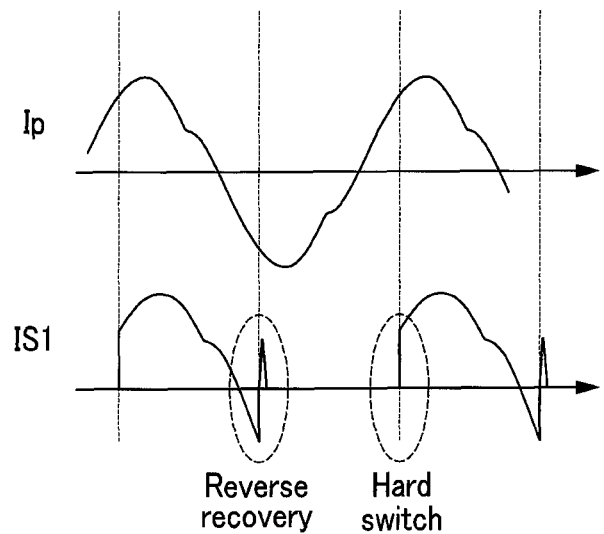
FIG. 3A shows a current flowing to a switch and a current when the conventional resonant current operates in a ZCS region.
Figure 3B:
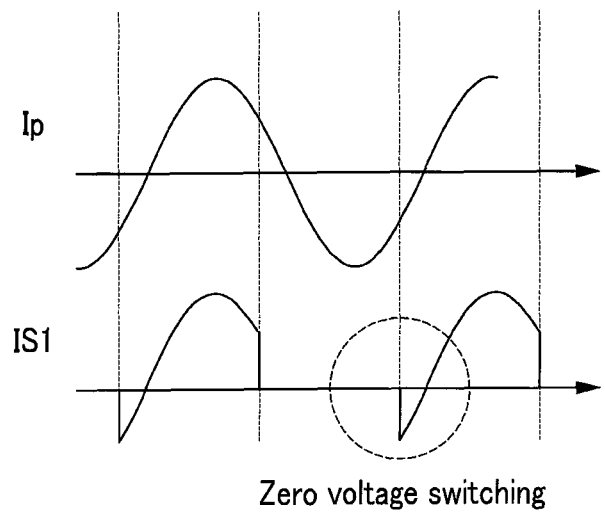
FIG. 3B shows a current flowing to the switch and a current when the conventional resonant converter operates in a ZVS region.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

In the following detailed description, only certain exemplary embodiments of the present invention have been shown and described, simply by way of illustration.

Figure 4:
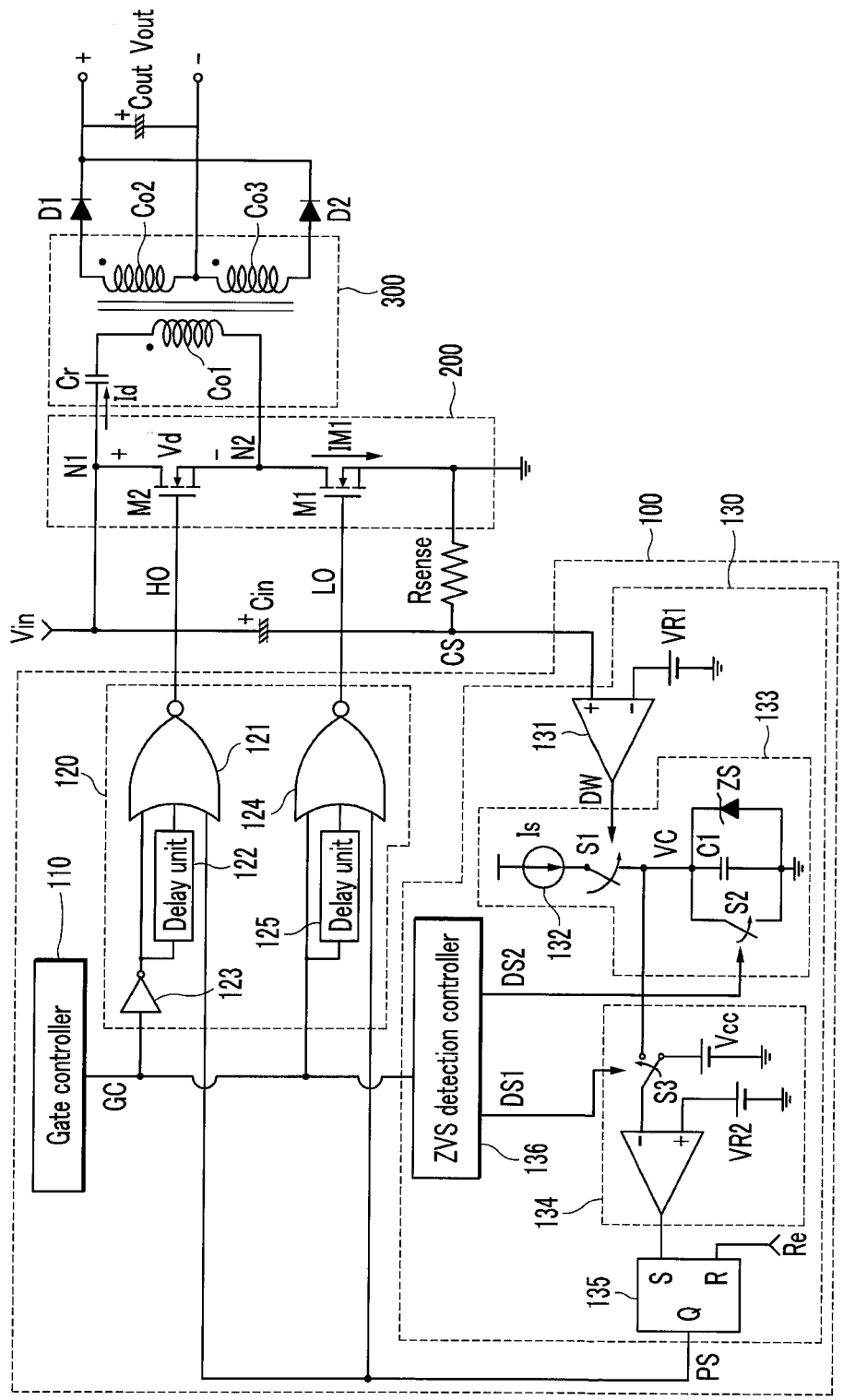
FIG. 4 shows a protection circuit and a resonant converter including the protection circuit according to an exemplary embodiment of the present invention.

FIG. 4 shows a protection circuit and a resonant converter including the protection circuit according to an exemplary embodiment of the present invention.

As shown in FIG. 4, a resonant converter includes a square wave generator 200, a resonant network unit 300, and a switch controller 100. Rectifier diodes D1 and D2 rectify currents flowing to secondary-side coils Co2 and Co3 of the resonant network unit 300. An output capacitor Cout is charged by the rectified current, and a voltage of the output capacitor Cout is an output voltage Vout of the resonant converter. The input voltage Vin is transmitted to a first end of an input capacitor Cin, and the input capacitor Cin smoothes the input voltage Vin. A resistor Rsense is connected between a second end of the input capacitor Cin and a ground GND. When a current IM1 flows in a low-side switch M1, a sense voltage CS is generated in the resistor Rsense. The sense voltage CS has an absolute value that is proportional to an absolute value of the current IM1, and flows in a direction that is opposite to a direction of the current IM1. The sense voltage CS that flows in an opposite direction of the direction of the current IM1 becomes a negative voltage when the current IM1 flows from a drain electrode to a source electrode of the low-side switch M1, and becomes a positive voltage when the current IM1 flows from the source electrode to the drain electrode of the low-side switch M1.

The square wave generator 200 includes a high-side switch M2 and a low-side switch M1. The square wave generator 200 generates a square wave with an input DC voltage Vin by switching operation of the high-side and low-side switches M2 and M1. In further detail, the high-side switch M2 and the low-side switch M2 are alternately turned on/off. Then, a driving voltage Vd between a node N1 and a node N2 becomes a square wave having a peak level that is the same level as the input DC voltage Vin and a 0V voltage as a low value. The high-side switch M2 is controlled by a gate signal HO transmitted from the switch controller 100, and the low-side switch M1 is controlled by a gate signal LO transmitted from the switch controller 100. The high-side switch M2 and the low-side switch M1 according to the exemplary embodiment of the present invention are realized as n-channel type metal oxide semiconductor field-effect transistors (MOSFETs).

A resonant network unit 300 includes a primary-side coil (i.e., primary coil Co1), secondary-side coils (i.e., secondary coil Co2 and third coil Co3), and a resonance capacitor Cr. A resonance is generated between leakage inductance and magnetizing inductance of a transformer formed of the primary-side and secondary-side coils and the resonance capacitor Cr. Due to the resonance, a resonance current Id input to the resonant network unit 300 has a sine wave. A voltage at lateral ends of the primary coil Co1 is transmitted to the secondary coil Co2 according to a turn ratio of the primary coil Co1 and the secondary coil Co2 (i.e., a winding number of the primary coil Co1/a winding number of the secondary coil Co2), and is transmitted to the third coil Co3 according to a turn ratio of the primary coil Co1 and the third coil Co3 (i.e., a winding number of the third coil Co2/a winding number of the primary coil Co1). A current flowing through the primary coil Co1 is transmitted to the secondary coil Co2 in inverse proportion to a turn ratio of the primary coil Co1 and the secondary coil Co2, and is transmitted to the third coil Co3 in inverse proportion to a turn ratio of the primary and third coils Co1 and Co3. The resonance current Id is the sum of a current generated when the current flowing through the secondary-side coils Co2 and Co3 influences the primary coil C1 and a current generated by the magnetizing inductance.

The switch controller 100 includes a gate controller 110, a gate driver 120, and a protection circuit 130. The switch controller 100 controls switching operation of the high-side switch M2 and the low-side switch M1. The switch controller 100 controls the high-side switch M2 and the low-side switch M1 to be alternately turned on and turned off, and controls the turn-on periods and the turn-off periods of the respective switches M2 and M1 to be equal. In addition, the switch controller 100 controls a dead time during which both of the high-side switch M2 and the low-side switch M1 are turned off to be located between the turn-on period of the high-side switch M2 and the turn-on period of the low-side switch M1 by controlling the switching operation of the respective switches M2 and M1. When one of the high-side switch M2 and the low-side switch M1 fails to perform zero voltage switching, the switch controller 100 interrupts the switching operation of the high-side switch M2 and the low-side switch M1.

The gate controller 110 controls a switching frequency according to an output voltage Vout. In further detail, the gate controller 110 generates a gate control signal GC having a frequency that varies according to the output voltage. The gate controller 110 increases the frequency of the gate control signal GC when the output voltage Vout is increased, and decreases the frequency of the gate control signal GC when the output voltage Vout is decreased. When the frequency of the gate control signal GC is increased, the switching frequencies of the high-side and low-side switches M2 and M1 are increased so that the peak value of the current flowing through the secondary-side coils is decreased and the output power of the converter is decreased. On the contrary, when the frequency of the gate control signal GC is decreased, the switching frequencies of the high-side and low-side switches M2 and M1 are decreased so the peak value of the current flowing through the secondary-side coils is increased and the output power of the converter is increased.

The gate driver 120 switches the high-side switch M2 and the low-side switch M1 according to the gate control signal GC. In further detail, the gate driver 120 generates a high-side gate signal HO and a low-side gate signal LO according to the gate control signal GC. The gate driver 120 includes a first NOR gate 121, a delay unit 122, an inverter 123, a second NOR gate 124, and a delay unit 125. The inverter 123 inverts the gate control signal GC, and the delay unit 122 outputs the inverted gate control signal GC after delaying for a predetermined time period. The first NOR gate 121 receives the inverted gate control signal GC and the output signal of the delay unit 122 to generate the high-side gate signal HO by performing a NOR operation. The predetermined time period of the delay unit 122 corresponds to the dead time. The delay unit 125 outputs the gate control signal GC after delaying for a predetermined time period. Then, the second NOR gate 124 receives the gate control signal GC and the output signal of the delay unit 125 to generate a low-side gate signal LO by performing a NOR operation.

The protection circuit 130 observes zero voltage switching of the high-side and low-side switches M1 and M2 by using a sense voltage CS. The high-side and low-side switches M1 and M2 operate with the same switching frequency, and duties of the two switches M1 and M2 are controlled to be equal. Thus, when one of the two switches fails to perform the zero voltage switching, the other switch also fails to perform the zero voltage switching. Therefore, according to the exemplary embodiment of the present invention, the zero voltage switching is observed by using the sense voltage CS corresponding to a current IM1 flowing through the low-side switch M1. A method for observing the zero voltage switching according to an exemplary embodiment of the present invention will now be described with reference to FIG. 5 and FIG. 6A to FIG. 6F.

Figure 5:
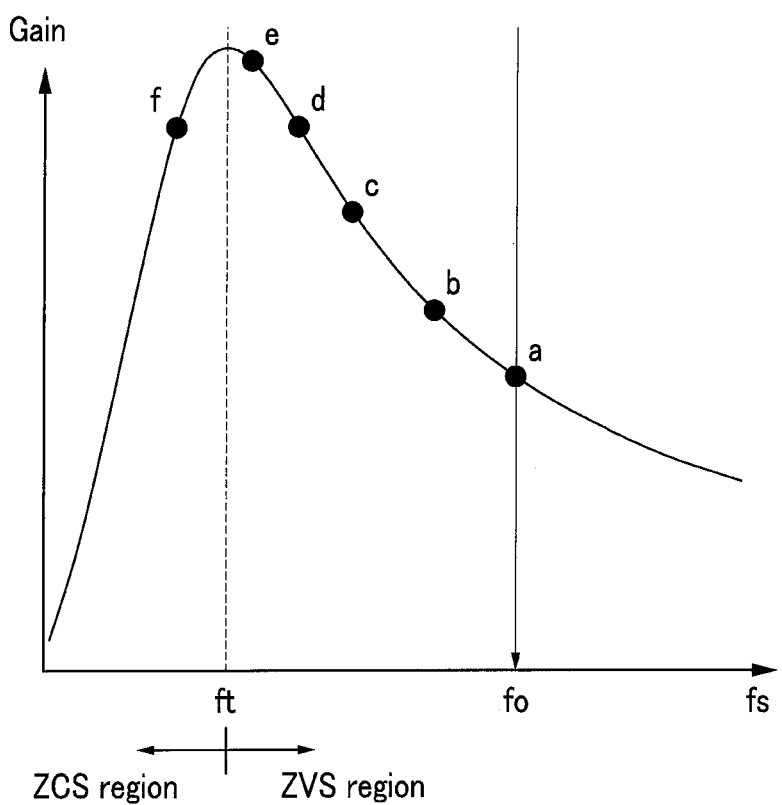
FIG. 5 shows a correlation between a gain between an input voltage and an output voltage and a switching frequency.

FIG. 5 shows a correlation between a gain of input and output voltages and a switching frequency fs. In FIG. 5, a frequency fo denotes a resonance frequency.

In addition, FIG. 6A to FIG. 6F show currents IM1_1 to IM1_6 flowing through the low-side switch M1 at 6 points in FIG. 5.

Figure 6A:
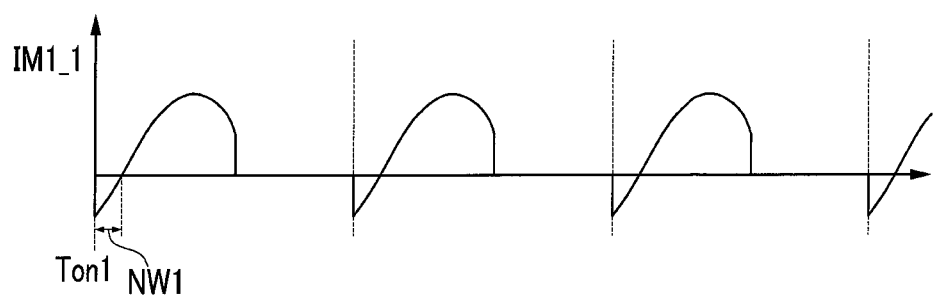
FIG. 6A to 6F show currents flowing to a low-side switch at 6 locations marked in FIG. 5.

The point a in FIG. 5 is included in the ZVS region, and, as shown in FIG. 6A, the current IM1_1 flows in a negative direction (i.e., a direction flowing from a source to a drain of the low-side switch) at a turn-on time Ton1 of the low-side switch M1 so that a voltage difference between the source and drain of the low-side switch M1 is zero.

Figure 6B:
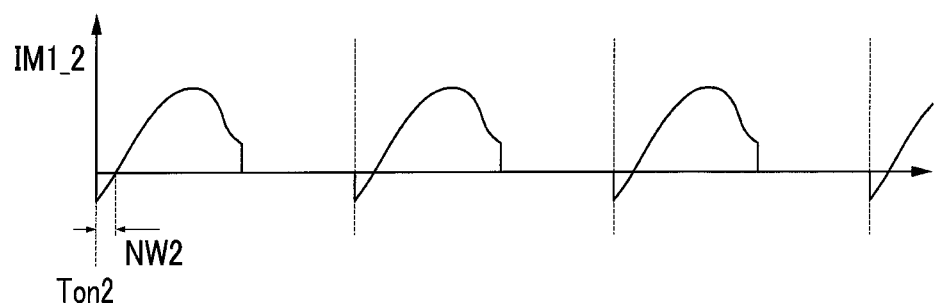

The point b of FIG. 5 is included in the ZVS region, and as shown in FIG. 6B, the current IM1_2 flows in the negative direction at a turn-on time Ton2 of the low-side switch M1 so that the voltage difference between the source and drain of the low-side switch M1 is zero.

Figure 6C:
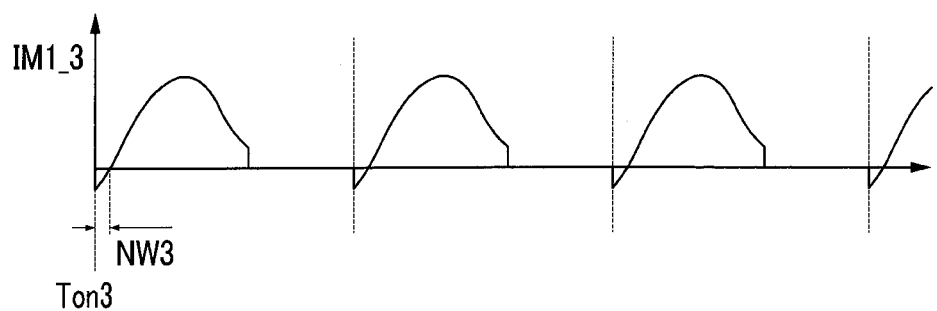
Figure 6D:
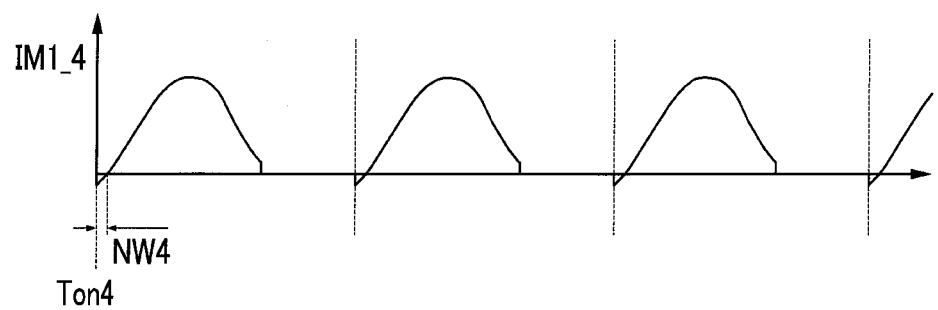

The points c and d of FIG. 5 are included in the ZVS region, and as shown in FIGS. 6C and 6D, the currents IM1_3 and IM1_4 flow in the negative direction at turn-on times Ton3 and Ton4 of the low-side switch M1 so that the voltage difference of the source and drain of the low-side switch M1 is zero.

Figure 6E:
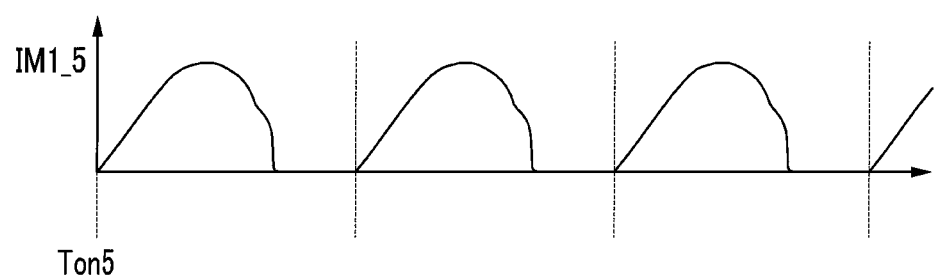

The point e of FIG. 5 is included in the ZVS region, and as shown in FIG. 6E, the current IM1_5 scarcely flows at a turn-on time Ton5 of the low-side switch M1. Then, the voltage difference of the source and drain of the low-side switch M1 may be greater than zero.

Figure 6F:
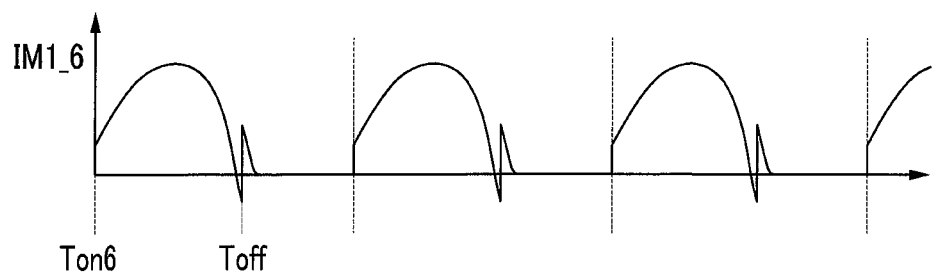

The point f of FIG. 5 is included in the ZCS region, and as shown in FIG. 6F, hard switching is generated by the current IM1_5 that is greater than zero at a turn-on time Ton6 of the low-side switch M1, and reverse recovery is generated at a turn-off time Toff of the low-side switch M1.

As described, as the operation region of the converter is included in the ZVS region and switching frequency is close to the reference frequency ft, a period (NW1 to NW4) during which the current IM1 flows in a negative direction (hereinafter referred to as the width of the negative part of the current IM1) from the turn-on time of the low-side switch M1 is decreased. In addition, as shown in FIG. 6E, although the operation region is included in the ZVS region, the zero voltage switching may fail if the switching frequency is too close to the reference frequency ft. According to the exemplary embodiment of the present invention, the width of the negative part of the first current IM1 is measured, and when the measured value is smaller than a predetermined reference value, the zero voltage switching is determined to have failed. The resonance converter according to the exemplary embodiment of the present invention performs a protection operation for stopping the switching operation when the zero voltage switching has failed.

The protection circuit 130 will now be described with reference to FIG. 4.

The protection circuit 130 includes a width measurement comparator 131, a timer 133, a ZVS determination comparator 134, a protection signal generator 135, and a ZVS detection controller 136.

The width measurement comparator 131 generates a detection signal DW corresponding to the width of the negative part of the current IM1 by using the sense voltage CS. In further detail, the width measurement comparator 131 compares the sense voltage CS and a predetermined reference voltage VR1 to determine a period during which the sense voltage CS is higher than the reference voltage VR1 to be the width of the negative part, and transmits a predetermined-level detection signal DW to the timer 133 during the period. In the exemplary embodiment of the present invention, the sense voltage CS is input to a non-inversion (+) terminal and the reference voltage VR1 is input to an inversion (−) terminal so that the detection DW during a period corresponding to the width of the negative part is high level. The reference voltage VR1 may be set to a ground voltage. However, in the exemplary embodiment of the present invention, zero voltage switching may fail when the switching frequency is close to the reference frequency ft even through the operation region is included in the ZVS region, so a predetermined margin set to a positive voltage close to the ground voltage is provided.

The timer 133 measures a period corresponding to the width of the negative part of the current by using the detection signal DW. The timer 133 generates a width detection voltage Vc corresponding to the measured method. The timer 133 includes a current source 132, a charge switch S1, a discharge switch S2, a capacitor C1, and a Zener diode ZS. When the charge switch S1 is turned on and the discharge switch S2 is turned off, a current Is of the current source 132 charges the capacitor C1 so that the width detection voltage Vc is increased. Since the Zener diode ZS is connected in parallel with the capacitor C1, an increase of the width detection voltage Vc does not exceed a breakdown voltage. The highest charging voltage of the capacitor C1, that is, the width detection voltage Vc, is maintained at a constant level as the breakdown voltage of the Zener diode ZS. When the charge switch S1 is turned off and the discharge switch S2 is turned on, the charges charged in the capacitor C1 are discharged so that the width detection voltage Vc becomes ground level. The switching operation of the charge switch S1 is controlled by the detection signal DW and therefore an increase period of the width detection voltage Vc is determined according to the detection signal DW. The charge switch S1 and the discharge switch S2 according to the exemplary embodiment of the present invention are turned on by a high-level signal and turned off by a low-level signal. Therefore, the width detection voltage Vc is increased when the detection signal DW is high level. In addition, the timer 133 includes the Zener diode ZS as means for stably controlling a voltage range of the width detection voltage Vc, but the present invention is not limited thereto.

When the high-level period of the detection signal DW is short, a charging period of the capacitor C1 is short so that the width detection voltage Vc is low. In the present exemplary embodiment, when the highest value of the width detection voltage Vc is lower than a predetermined reference voltage VR2 during a turn-on period of the low-side switch M1, the width of the negative part of the current is short so that the zero voltage switching is determined to have failed. The reference voltage VR1 and the reference voltage VR2 can be changed according to design. As the reference voltage VR1 is decreased, the width of the negative part of the current is increased, and as the reference voltage VR1 is decreased, the width of the negative part of the current is decreased. In addition, as the reference voltage VR2 is increased, the possibility of the zero voltage switching is decreased, and as the reference voltage VR2 is decreased, the possibility of the zero voltage switching is increased. Therefore, the zero voltage switching condition can be narrowed by increasing the reference voltages VR1 and VR2, and can be widened by decreasing the reference voltages VR1 and VR2.

The ZVS determination comparator 134 determines the zero voltage switching by using the width detection voltage Vc. An inversion (−) terminal of the ZVS determination comparator 134 is connected to a high-level voltage Vcc while the low-side switch M1 is turned on, and is connected to the width detection voltage Vc during a predetermined period from a turn-off time of the low-side switch M1. The reference voltage VR2 is input to a non-inversion (+) terminal of the ZVS determination comparator 134, and outputs a high-level signal when the reference voltage VR2 is greater than the voltage input to the non-inversion (−) terminal.

The protection signal generator 135 stops the switching operation of the high-side and low-side switches M1 and M2 when the zero voltage switching fails. In further detail, in the exemplary embodiment of the present invention, the protection signal generator 135 outputs a high-level output signal through an output terminal Q when a rising edge timing of an input signal at a set terminal S is detected, and maintains the signal at the output terminal Q in high level until a high-level reset signal Re is detected at a reset terminal R. The reset signal Re becomes a high-level pulse at an initial driving stage of the converter, and resets an output signal of the output terminal Q to low level. Therefore, the protection signal generator 135 is synchronized when an output signal of the ZVS determination comparator 134 is input to the set terminal S, and generates a high-level protection signal PS. When the high-level protection signal PS is transmitted to NOR gates 121 and 124 of the gate driver 120, the NOR gates 121 and 124 transmit low-level gate signals HO and LO to the high-side switch M2 and the low-side switch M1 irrespective of other input signals. Then, the high-side switch M2 and the low-side switch M1 are turned off.

The ZVS detection controller 136 resets the width detection voltage Vc, and controls the ZVS determination comparator 134 to determine whether the zero voltage switching has failed after the low-side switch M1 is turned off. In further detail, the ZVS detection controller 136 receives a gate control signal GC from the gate controller 110 to detect a turn-off time of the low-side switch M1, and controls the ZVS determination comparator 134 to compare the width detection voltage Vc and the reference voltage VR2 during a comparison period d1 from the turn-off time of the low-side switch M1. In further detail, the ZVS detection controller 136 generates a high-level pulse signal DS1 during the comparison period d1. The switch S3 connects the inversion (−) terminal of the ZVS determination comparator 134 to the width detection voltage Vc in response to a high-level comparison control signal DS1. In addition, the ZVS detection controller 136 generates a pulse signal DS2 to turn on the discharge switch S2 for reset of the width detection voltage Vc after a delay period d2 from the turn-off time.

Hereinafter, a protection method of a resonance converter according to an exemplary embodiment of the present invention will be described with reference to FIG. 7.

Figure 7:
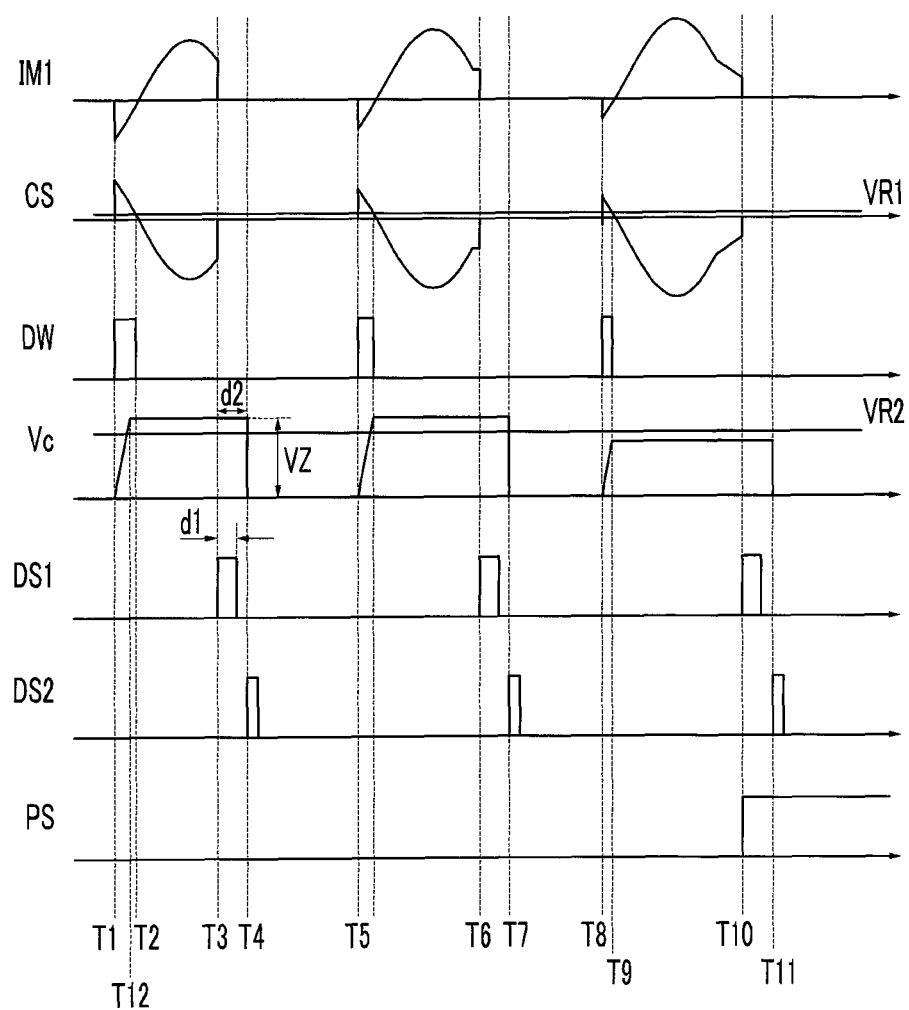
FIG. 7 shows signal waveforms generated in the resonant converter according to the exemplary embodiment of the present invention.

FIG. 7 shows a signal waveform generated from a resonance converter according to an exemplary embodiment of the present invention. In FIG. 7, it is assumed that a switching frequency fs moves to the left within a ZVS region for description of the protection method.

When a current IM1 flows in a low-side switch M1 at a time T1, a sense voltage CS is generated. During a period T1 to T2, the sense voltage CS is greater than a reference voltage VR1. Then, the charge switch S1 is turned on because a detection signal DW is high level during the period T1 to T2. A width detection voltage Vc is increased by a current Is of a current source 132 until reaching a regulated voltage that is determined by a breakdown voltage of a Zener diode ZS at a time T12, and then is maintained at a constant level. When the detection signal DW is low level at the time T2, the charging switch S1 is turned off and the width detection voltage Vc is maintained at a constant level.

When a low-side switch M1 is turned off at a time T3, a pulse signal DS1 is generated during a first comparison period d1, and a ZVS determination comparator 134 compares the width detection voltage Vc and a reference voltage VR2. Since the width detection voltage Vc is greater than the reference voltage VR2, an output voltage of the ZVS determination comparator 134 is low level and the protection signal generator 135 maintains a protection signal PS to be low level.

When a pulse signal DS2 is generated at a time T4, which is a time after a delay period d2 from the time T3, a discharge switch S2 is turned on and the width detection voltage Vc becomes a ground voltage.

The above-described processes start to repeat at a time T5. When the low-side switch M1 is turned off at a time T6, the pulse signal DS1 is generated and the ZVS determination comparator 134 compares the width detection voltage Vc and the reference voltage VR2. Since the width detection voltage Vc is greater than the reference voltage VR2, an output voltage of the ZVS determination comparator 134 is low level and the protection signal generator 135 maintains a protection signal PS at a low level. The pulse signal DS2 is generated at a time T7 and the width detection voltage Vc becomes the ground voltage.

Hereinafter, operation through which the protection signal PS becomes a high-level pulse will be described.

When the current IM1 flows in the low-side switch M1 at a time T8, the sense voltage CS is generated. During a period T8 to T9, the sense voltage CS is greater than the reference voltage VR1. Then, the charge switch S1 is turned on because the detection signal DW is high level during the period T8 to T9. The width detection voltage Vc is increased by the current Is of the current source 132. Since the charge switch S1 is turned off at the time T9, the width detection voltage Vc is not further increased and is maintained at the voltage level at the time T9. When the low-side switch M1 is turned off at a time T10, the pulse signal DS1 is generated and the ZVS determination comparator 134 compares the width detection voltage Vc and the reference voltage VR2. Since the width detection voltage Vc is smaller than the reference voltage VR2, the ZVS determination comparator 134 outputs a high-level voltage and a high-level signal is input to the set terminal S of the protection signal generator 135. Then, the ZVS determination comparator 134 generates a high-level protection signal PS through the output terminal Q. The high-side and low-side switches M2 and M1 are turned off at the time T10. The pulse signal DS is applied at a time T11 and the width detection voltage Vc is reset.

As shown in FIG. 7, as the switching frequency fs moves to the left in the ZVS region (i.e., as close to the reference frequency), a high-level pulse period of the detection signal CS is decreased and the highest value of the width detection voltage Vc becomes smaller than the reference voltage VR2 by the timer 133. In FIG. 7, the zero voltage switching failure is detected by setting a predetermined margin. Thus, the reference voltages VR1 and VR2 are predetermined positive voltages close to the ground voltage, and protection operation is generated even though a period during which the current IM1 flows in the negative direction exists. As previously described, the reference voltages VR1 and VR2 may be changed according to the design of the margin, and the present invention is not limited to the exemplary embodiment shown in FIG. 7.

The width of the negative part of the current IM1 is measured and the high-side and low-side switches are turned off if the measured value is smaller than a predetermined reference value, but the present invention is not limited thereto.

As described with reference to FIG. 5, when the switching frequency is increased, the operation region of the resonance converter moves to the zero voltage switching region. According to another exemplary embodiment of the present invention, a width of a negative part of a current is measured and a switching frequency is increased when the measured value is smaller than a predetermined reference value. In further detail, in FIG. 4, the protection signal PS is not transmitted to the gate driver 120 but is transmitted to the gate controller 110, and the gate controller 110 increases a frequency of the gate control signal GC according to the protection signal PS.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A resonance converter having first and second switches, comprising:
    a sense resistor coupled to receive a first current flowing through the first switch; and
    a protection circuit coupled to the sense resistor, the protection circuit measuring a sense voltage developed on the sense resistor by the first current to determine a direction of the first current through the first switch based on a polarity of the sense voltage, determining a length of a time period during which the first current is detected to be flowing in a negative direction through the first switch, comparing the length of the time period to a predetermined reference time period when the first switch is turned off, and detecting a zero voltage switching (ZVS) failure when the length of the time period is shorter than the predetermined reference time period.

2. The resonance converter of claim 1, further comprising: stopping switching of the first and second switches upon detection of a ZVS failure.

3. The resonance converter of claim 1, wherein the protection circuit comprises:
    a width measurement comparator comparing the sense voltage and a first reference voltage to generate a level detection signal;
    a timer using the level detection signal to generate a width detection voltage corresponding to the length of the time period during which the first current is detected to be flowing in the negative direction through the first switch; and
    a ZVS determination comparator comparing the width detection voltage and a second reference voltage when the first switch is turned off to determine a ZVS failure according to the comparison result.

4. The resonance converter of claim 3, wherein the protection circuit further comprises a ZVS detection controller detecting turn-on/off of the first switch, controlling the ZVS determination comparator to compare the width detection voltage and the second reference voltage when the first switch is turned off, and resetting the width detection voltage after a predetermined delay period from a turn-off time of the first switch.

5. The resonance converter of claim 4, wherein the timer comprises:
    a charge switch being turned on/off according to the level detection signal;
    a current source connected to a first end of the charge switch;
    a capacitor having a first end connected to a second end of the charge switch; and
    a discharge switch connected in parallel with the capacitor, wherein a voltage at the first end of the capacitor is the width detection voltage.

6. The resonance converter of claim 5, wherein the ZVS detection controller turns on the discharge switch after the predetermined delay period.

7. The resonance converter of claim 6, wherein the ZVS determination comparator comprises:
    a first input terminal;
    a second input terminal to which the second reference voltage is input; and
    a switch having a first end connected to the first input terminal, transmitting the width detection voltage to the first input terminal during a predetermined comparison period from the turn-off time of the first switch, and transmitting a source voltage to the first input terminal during a turn-on period of the first switch.

8. The resonance converter of claim 3, wherein the protection circuit further comprises a protection signal generator receiving a ZVS failure signal from the ZVS determination comparator and generating a protection signal to stop switching of the first and second switches, and
    the resonance converter further comprises a gate driver that stops switching of the first and second switches according to the protection signal.

9. The resonance converter of claim 3, wherein the protection circuit further comprises a protection signal generator receiving a ZVS failure signal from the ZVS determination comparator and generating a protection signal for increasing switching frequencies of the first and second switches, and
    the resonance converter further comprises a gate driver that increases the switching frequencies of the first and second switches according to the protection signal.

10. A protection method of a resonance converter having first and second switches, comprising:
    generating a sense voltage indicative of direction of a first current flowing through the first switch;
    using the sense voltage to measure a length of a time period during which the first current is flowing in a negative direction through the first switch; and
    detecting a zero voltage switching (ZVS) failure when the length of the time period during which the first current is flowing in the negative direction through the first switch is shorter than a predetermined reference time period.

11. The protection method of claim 10, wherein using the sense voltage to measure the length of the time period during which the first current is flowing in the negative direction through the first switch comprises:
    generating a level detection signal by comparing the sense voltage and a predetermined first reference voltage; and
    using the level detection signal to generate a width detection voltage corresponding to the length of the time period during which the first current is flowing in the negative direction through the first switch.

12. The protection method of claim 11, wherein detecting the zero voltage switching (ZVS) failure comprises comparing the width detection voltage and a second reference voltage when the first switch is turned off.

13. The protection method of claim 12, further comprising turning off the first and second switches when the ZVS failure is detected.

14. The protection method of claim 13, further comprising increasing operation frequencies of the first and second switches when the ZVS failure is detected.

* * * * *